United States Patent
Shingu et al.

(10) Patent No.: US 6,766,636 B2
(45) Date of Patent: Jul. 27, 2004

(54) GAS TURBINE INTAKE AIR FILTER UNIT

(75) Inventors: Noriya Shingu, Osaka (JP); Mitsuru Dougahara, Osaka (JP); Hidemasa Takashima, Osaka (JP); Shigeru Yoshitake, Osaka (JP)

(73) Assignee: The Kansai Electric Power Co., Inc., Osaka-fu (JP)

( * ) Notice: Subject to any disclaimer, the term of this patent is extended or adjusted under 35 U.S.C. 154(b) by 29 days.

(21) Appl. No.: 10/339,769

(22) Filed: Jan. 8, 2003

(65) Prior Publication Data

US 2003/0177755 A1 Sep. 25, 2003

(30) Foreign Application Priority Data

Mar. 5, 2002 (JP) ........................................ 2002-058919

(51) Int. Cl.[7] .............................. F02C 7/05; B01D 46/00
(52) U.S. Cl. ..................... 60/39.092; 55/385.3; 55/485; 55/489
(58) Field of Search ........................ 60/39.092; 55/489, 55/485, 385.3

(56) References Cited

U.S. PATENT DOCUMENTS

| | | | | |
|---|---|---|---|---|
| 3,815,342 A | * | 6/1974 | Watts ........................... | 55/493 |
| 5,888,260 A | * | 3/1999 | Sica ........................... | 55/385.3 |
| 6,260,658 B1 | * | 7/2001 | Darrell et al. ............... | 181/224 |
| 6,508,865 B2 | * | 1/2003 | Colson ........................ | 55/480 |
| 6,540,805 B2 | * | 4/2003 | Ohno et al. ................ | 55/385.3 |
| 6,598,384 B1 | * | 7/2003 | Adkins ..................... | 60/39.092 |

FOREIGN PATENT DOCUMENTS

| | | | |
|---|---|---|---|
| JP | 07-253028 | * | 10/1995 |
| JP | 08-177524 | * | 7/1996 |
| WO | WO 98/48160 | * | 10/1998 |

* cited by examiner

Primary Examiner—Ted Kim
(74) Attorney, Agent, or Firm—J.C. Patents

(57) ABSTRACT

The invention provides a gas turbine intake air filter unit, wherein flow resistance of intake air passing through a tertiary filter layer does not become unreasonably great despite the filter layers are increased from two stages to three stages, and a balance of collecting efficiency of the filter layers and the intake air flow resistance is optimized.

A weather louver 10, a primary filter layer 11, a secondary filter layer 12, and a tertiary filter layer 13 are sequentially disposed from an upstream side in the filter unit 1 installed at an upstream side end portion of an intake duct 2 communicating with a gas turbine 3, at least a recess 13e is formed toward a downstream side of the intake air flow A' on an end face filter layer portion 13a that is a constituent of the tertiary filter layer 13 and is disposed orthogonally to the intake air flow A' inside the intake duct 2.

20 Claims, 3 Drawing Sheets

GAS TURBINE INTAKE AIR FILTER UNIT

BACKGROUND OF THE INVENTION

1. Field of the Invention

The present invention relates to a gas turbine intake air filter unit, more specifically to improving technique of a filter unit for efficiently collecting dust contained in outside air aspirated into a gas turbine.

2. Description of the Related Art

As is popular in the industry, a gas turbine is provided with an intake air filter unit at an upstream side end portion of an intake duct communicating with an internal area of the gas turbine, for collecting fine dust contained in outside air aspirated by an air compressor. Since it has been a conventional understanding that operation of the air compressor would not be seriously disturbed provided that the intake air filter unit is capable of collecting dust of a particle diameter of approx. 5 µm or larger, a two-stage intake air filter unit having two filter layers has conventionally been employed.

However, in such two-stage intake air filter unit, minute dust of a particle diameter of for instance less than 1 µm that can pass through the filter layers adheres to a vane of the air compressor, leading to lower performance of the air compressor and further to a substantial output loss of the gas turbine, and resultantly the gas turbine cannot satisfy current demand for a high output. Employing filter layers having a higher collecting efficiency in the two-stage intake air filter unit could be a solution of the problem, however such a simple measure only causes disadvantages such as a shorter life span of the filter layers and need for frequently replacing the filter layers in short intervals. Besides, when replacing the filter layers operation of the gas turbine must be suspended in order to prevent intrusion of dust into inside the gas turbine, therefore availability factor of the gas turbine inevitably becomes lower.

Accordingly, as disclosed in JP-A No.7-253028, recently a three-stage intake air filter unit having three filter layers has been proposed, and has come to be put to trial. The filter unit disclosed in this Publication comprises a primary filter layer constituted of a panel type demister and a rolled strap type or streamer type prefilter, a secondary filter layer constituted of medium performance filters and a tertiary filter layer constituted of high performance filters, sequentially aligned from an upstream side in a direction of intake air flow.

In this case the panel type demister comprises unitary demisters formed into a plate shape by coating and bonding with a binder a multitude of small elastic bodies made of animal and vegetable fibers curled into a spring shape, and four rows of four pieces each, totally 16 pieces of such unitary demisters are disposed inside a casing located at an upstream side end portion of the intake duct.

Also, the rolled strap type and the streamer type prefilter are unitary filters made of a glass fiber or organic fibers such as acrylic fiber etc. The rolled strap type prefilter comprises a strap-shaped fiber filter medium spanned between a pair of rolls on which the fiber filter medium can be rolled, while the streamer type prefilter comprises a multitude of bags disposed in parallel close to one another with the respective openings fixed to a frame, and four rows of four pieces each, totally 16 pieces of either of such prefilters disposed inside the casing constitute the primary filter layer.

Further, the medium performance filter and the high performance filter are unitary filters comprising a high efficiency filter medium and a low efficiency filter medium closely layered, bent in zigzags with the projections and recesses thereof aligned with a direction of intake air flow and then set in a box, and four rows of four pieces each, totally 16 pieces of such unitary filters disposed at two positions inside the casing respectively constitute the secondary filter layer and the tertiary filter layer.

With respect to the foregoing three-stage intake air filter unit, in all of the primary filter layer, secondary filter layer and tertiary filter layer, the prefilters, medium performance filters and high performance filters that are the unitary filters of the respective filter layers are disposed on a plane that is orthogonal to a direction of intake air flow inside the intake duct, as shown in FIG. 1 of the aforementioned Publication.

More specifically, in the primary filter layer totally 16 pieces of the rolled strap type or streamer type prefilters are disposed on an identical plane, in the secondary filter layer totally 16 pieces of the medium performance filters are disposed on an identical plane, and in the tertiary filter layer totally 16 pieces of the high performance filters are disposed on an identical plane.

Under such configuration wherein the unitary filters are disposed on a plane in all of the filter layers, however, when the filter layers are increased from two stages to three stages, flow resistance hence pressure loss of the intake air passing through the tertiary filter layer may become unreasonably great because of insufficient intake air passing area of the tertiary filter layer, thereby disturbing smooth flow of the intake air and resultantly causing driving loss of an air compressor.

Accordingly a balance of collecting efficiency of the tertiary filter layer and intake air flow resistance becomes a critical issue to be explored, however at present development of an intake air filter unit focused on optimization of such balance has not yet been achieved, because of which such problems as adherence of minute dust to an air compressor and reduction of life span of filters and so forth have not been effectively solved.

SUMMARY OF THE INVENTION

In view of the foregoing problems, it is a technical object of the present invention to provide a gas turbine intake air filter unit, wherein flow resistance of intake air passing through a tertiary filter layer does not become unreasonably great despite the filter layers are increased from two stages to three stages, and a balance of collecting efficiency of the filter layers and the intake air flow resistance is optimized.

In order to solve the foregoing technical problem, the invention provides a gas turbine intake air filter unit, comprising a primary filter layer, a secondary filter layer, and a tertiary filter layer placed at an upstream side end portion of an intake duct that leads intake air into an internal area of a gas turbine and sequentially aligned from an upstream side; wherein the primary, secondary and tertiary filter layers respectively include a plurality of unitary filters; and the plurality of unitary filters of the tertiary filter layer are aligned in such a manner that at least a recess is formed toward a downstream side of the intake air flow.

Under such constitution, since the plurality of unitary filters in the tertiary filter layer are disposed so as to include at least a recess toward a downstream side of the intake air flow, intake air passing area is increased in proportion to the area of the recessed portion. Accordingly, increase of flow resistance, hence pressure loss of the intake air through the tertiary filter layer is properly restrained, therefore smooth flow of the intake air is secured and driving loss of the air compressor is prevented. Moreover, a balance of collecting efficiency of the three filter layers and the intake air flow resistance becomes extremely favorable, therefore adherence of minute dust to the air compressor and reduction of life span of filter layer can be effectively avoided. In addition, since the recess is formed in a direction of downstream side of the intake air flow, there is no likelihood of interference with the secondary filter layers located at an upstream side of the tertiary filter layer, and an optimum layout of the three filter layers can be maintained.

In this case, it is preferable that a downstream side end portion of the recess is located at an upstream side of a wind velocity reference line serving as an index of whether or not a turbulent flow of intake air causes noise and/or vibration. Here, the wind velocity reference line stands for a reference line by which to distinguish whether or not noise and/or vibration is generated in the tertiary filter layer by a turbulent flow of the intake air when the intake air flows into the intake duct from the filter unit, and specifically the reference line is an index showing whether or not flow velocity of the intake air inside the filter unit exceeds 5.7 m/sec. And since the intake air flow velocity is relatively slow in an upstream side area of the wind velocity reference line, such area is naturally an area where the noise or vibration is not generated. Consequently, such constitution effectively prevents generation of noise or vibration in the tertiary filter layer due to a turbulent flow of the intake air, while effectively maintaining the above described various advantages of forming a recess toward a downstream side in the tertiary filter layer.

Also, it is preferable that the recess is disposed so as to confront an upstream side end opening of the intake duct. By such configuration the recess of the tertiary filter layer falls on a path that a main stream of the intake air flowing toward the intake duct is passing through, i.e. a path where the intake air flow amount is the largest, therefore the intake air passing area is increased at an area where clogging by dust is most likely to take place. As a result, clogging by dust and increase thereby of flow resistance in the tertiary filter layer can be efficiently avoided.

In all the foregoing constitutions, it is preferable that the primary, secondary and tertiary filter layers are formed so as to cover the upstream end opening of the intake duct in a bag shape. Under such configuration, when the intake air flows into the intake duct through the primary, secondary and tertiary filter layers one after another, the intake air is introduced from various directions including a lateral portion of the intake air filter unit, in addition to an upstream side end portion of the intake air filter unit along the intake air flow direction inside the intake duct. Therefore, the intake air passing area of the three filter layers is substantially increased, and as a result untimely increase of the intake air flow resistance due to clogging by dust etc. can be restrained, and sufficient intake air passing area can still be secured by making the intake air filter unit more compact in dimensions. Also, in case where the primary, secondary and tertiary filter layers are formed in a bag shape, though a room for the tertiary filter layer inevitably becomes smaller compared with the primary and secondary filter layers, since a recess is formed in the tertiary filter layer as already described which is making the intake air passing area larger, unreasonable increase of the intake air flow resistance by having to pass through the tertiary filter layer can be effectively restrained.

Also, in the foregoing constitutions, it is preferable that each of the unitary filters of the primary filter layer and of the secondary filter layer is insert-fitted to a first fixing frame, and that each of the unitary filters of the tertiary filter layer is insert-fitted to a second fixing frame. In case where a recess is formed in the tertiary filter layer as above, the second fixing frame is formed in a bent shape according to a shape of the recess, while when the respective filter layers are formed in a bag shape the first fixing frame and the second fixing frame are respectively formed in a bent shape according to respective shapes of the filter layers. Consequently, providing only two fixing frames despite there are three filter layers contributes to reduction of number of parts, simplification of assembly and cost-saving.

Further, in the foregoing constitutions, it is preferable that a weather louver for integrating and refracting intake air flow is located at an upstream side of the primary filter layer. Under such arrangement, even when outside air contains rain water or mist the weather louver prevents such liquid from penetrating into the filter unit, therefore especially the primary filter layer can be kept from adherence of liquid, which results in a longer life span of the filter layer and prevention of corrosion inside the gas turbine.

In this case, it is preferable that the weather louver is formed so as to cover the upstream end opening of the intake duct in a bag shape. As a result of such arrangement, since the weather louver covers the entire area of the respective filter layers in case where the filter layers are formed in a bag shape as described above, the weather louver properly follows up a shape of the filter layers so as to securely restrain penetration of rain water etc.

DESCRIPTION OF THE PREFERRED EMBODIMENTS

Figure 1:
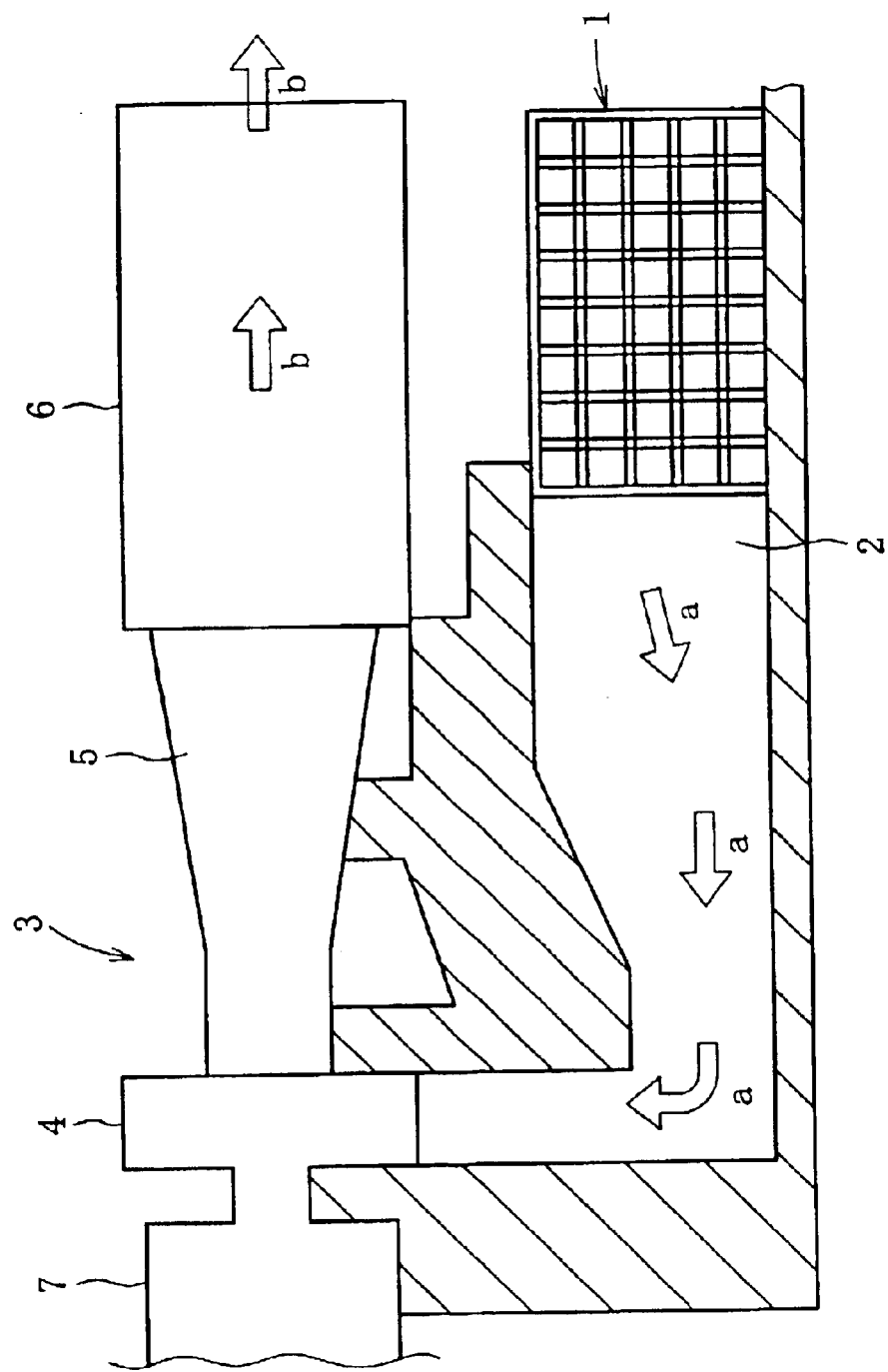
FIG. 1 is a schematic side view showing flow of intake air passing through a gas turbine intake air filter unit according to the embodiment of the present invention.

An embodiment of the present invention shall be described hereunder referring to the accompanying drawings. FIG. 1 is a schematic side view showing flow of intake air passing through a gas turbine intake air filter unit (hereinafter simply referred to as "filter unit") according to the embodiment of the invention, FIG. 2 is a transversal cross-sectional view showing an entire constitution of the filter unit, and FIG. 3 is a fragmentary perspective exploded view showing a portion of the filter unit.

Referring to FIG. 1, intake air that has passed through the filter unit 1 is introduced into an air compressor 4 of the gas turbine 3 through an intake duct 2 as shown by the arrows a, after which the intake air passes through a turbine unit 5 and is discharged toward a chimney or a heat recovery boiler through an exhaust duct 6 as shown by the arrows b. By the way, reference numeral 7 stands for a generator.

Figure 2:
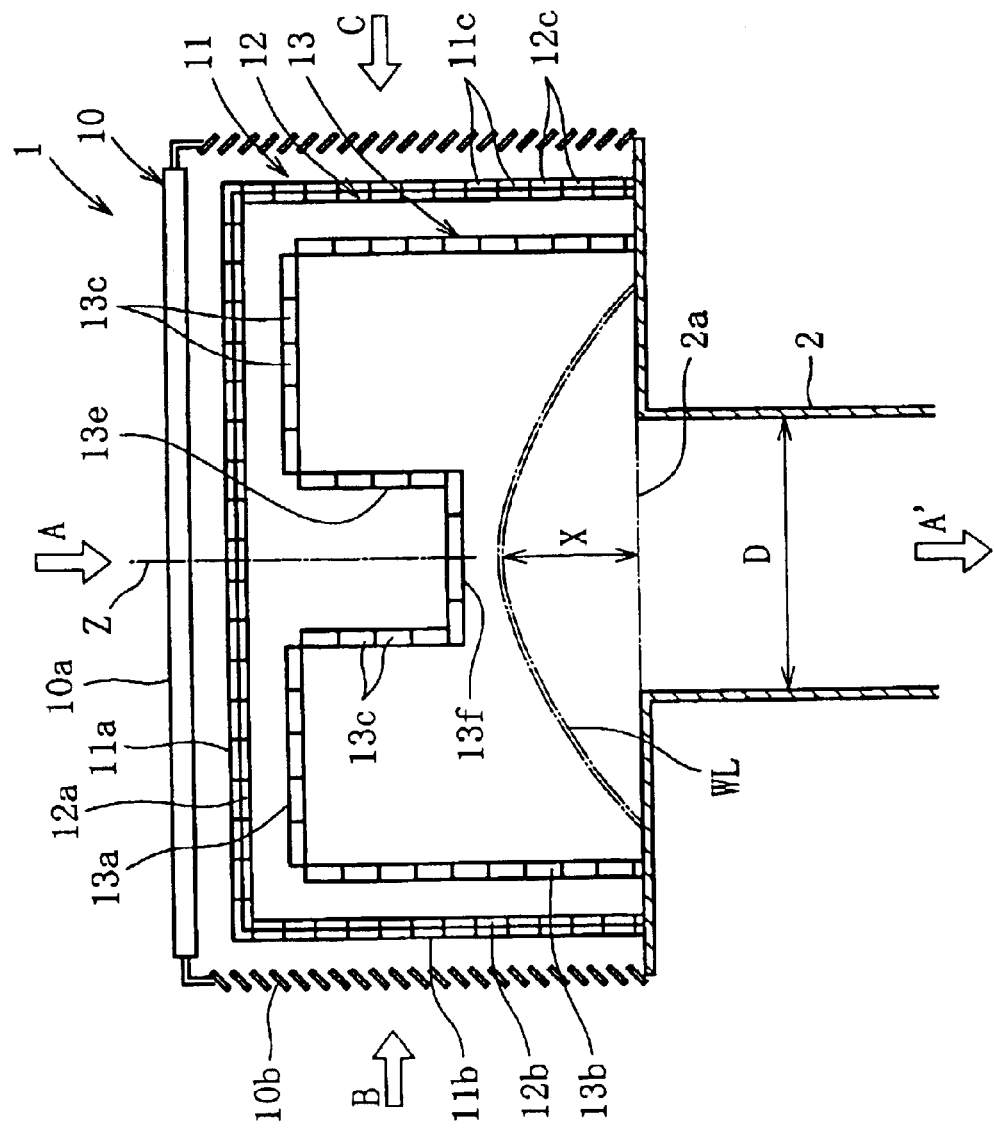
FIG. 2 is a transversal cross-sectional view showing an entire constitution of the gas turbine intake air filter unit according to the embodiment of the invention.
Figure 3:
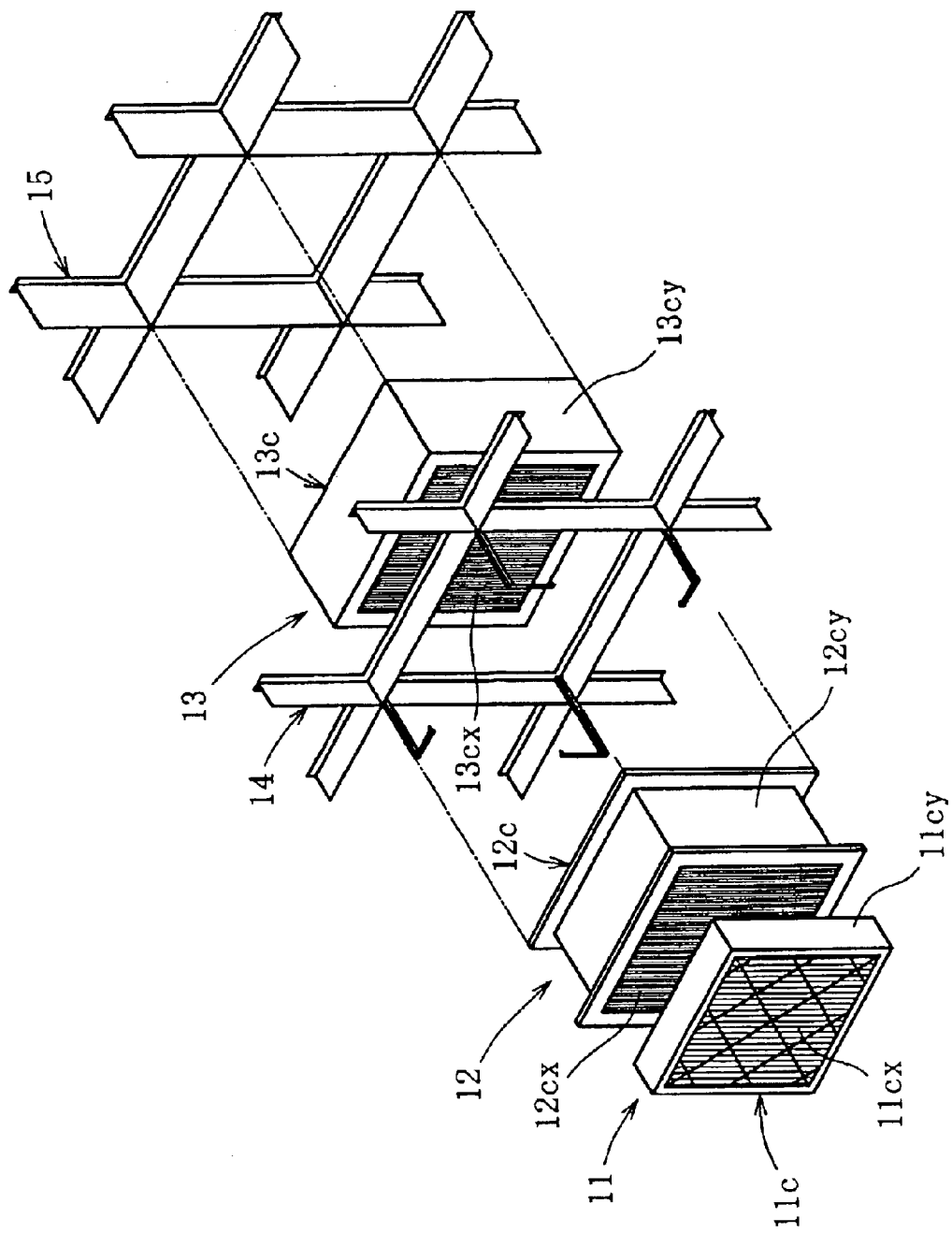
FIG. 3 is a fragmentary perspective exploded view showing a portion of the gas turbine intake air filter unit according to the embodiment of the invention.

The filter unit 1 is installed at an upstream side end portion of the intake duct 2 as shown in FIG. 2, and a weather louver 10, a primary filter layer 11, secondary filter layer 12 and the tertiary filter layer 13 are sequentially aligned from an upstream side of the intake air flow A, B and C. And the weather louver 10 and the respective filter layers 11, 12 and 13 are formed so as to cover an upstream end opening 2a of the intake duct 2 in a bag shape. According to the embodiment, a cross-sectional shape of the filter unit 1 (cross-section orthogonal to the intake air flow A' inside the intake duct 2) is a rectangular shape, while such cross-sectional shape may also be circular or polygonal, and a cross-sectional shape of the intake duct 2 may also be circular or polygonal. Also, a flow passage area of the intake duct 2 is designed to be smaller than an inner area of the cross-section of the tertiary filter layer 13.

More specifically, the primary, secondary and tertiary filter layers 11, 12 and 13 respectively comprise end face filter layer portions 11a, 12a and 13a disposed orthogonally to the intake air flow A' inside the intake duct 2, and lateral face filter layer portions 11b, 12b and 13b extended from a border portions of the end face filter layer portions 11a, 12a and 13a respectively toward a downstream side of the intake air flow A'. Also, the weather louver 10 comprises an end face louver portion 10a and lateral face louver portions 10b.

As shown in FIG. 3, each of the primary unitary filters 11c of the primary filter layer 11 and each of the secondary unitary filters 12c of the secondary filter layer 12 is insert-fitted to a grid-shaped first fixing frame 14, while each of the tertiary unitary filters 13c of the tertiary filter layer 13 is insert-fitted to the grid-shaped second fixing frame 15. In addition, the weather louver 10 comprises vanes for integrating the respective intake air flows A, B and C and refracting the integrated flows, i.e. has substantially the same structure as a refraction type vane eliminator.

In this embodiment, the primary unitary filters 11c are of a panel type wherein glass fiber 11cx is filled within a rectangular unitary frame 11cy, and for instance more than 50 pieces of such primary unitary filters 11c disposed in multiple rows and multiple stages in the first fixing frame 14 constitute the primary filter layer 11, which comprises the end face filter layer portion 11a and the lateral face filter layer portions 11b.

Also, the secondary unitary filters 12c comprise non-woven fabric 12cx made of glass fiber filled within a rectangular unitary frame 12cy that is deeper than the primary unitary filters 11c, and for instance more than 50 pieces of such secondary unitary filters 12c laid over the primary unitary filters 11c and disposed in multiple rows and multiple stages in the first fixing frame 14 constitute the secondary filter layer 12, which comprises the end face filter layer portion 12a and the lateral face filter layer portions 12b.

Further, the tertiary unitary filters 13c comprises non-woven fabric 13cx made of glass fiber filled so as to constitute finer meshes in a unitary frame 13cy of generally the same depth as the secondary unitary filters 12c, and for instance more than 50 pieces of such tertiary unitary filters 13c disposed in multiple rows and multiple stages with a predetermined clearance from the secondary unitary filters 12c in the second fixing frame 15 constitute the tertiary filter layer 13, which comprises the end face filter layer portion 13a and the lateral face filter layer portions 13b.

Still further, the weather louver 10 (not shown in FIG. 3) may either comprise a multitude of unitary louvers disposed in multiple rows and multiple stages insert-fitted to a fixing frame similarly to the unitary filters 11c, 12c and 13c of the respective filter layers 11, 12 and 13, or comprise a lesser number of unitary louvers, for example three portions including an end face louver portion 10a and two lateral face louver portions 10b.

On the end face filter layer portion 13a of the tertiary filter layer 13, a recess 13e is formed toward a downstream side of the intake air flow A', as shown in FIG. 2. More specifically, the second fixing frame 15 is formed in a bent shape so as to include the recess 13e, and a multitude of the tertiary unitary filters 13c are disposed in the second fixing frame 15 of the bent shape. In this embodiment, the recess 13e is formed on the end face filter layer portion 13a over a center axial line Z along the intake air flow A' in the filter unit 1. In other words, the recess 13e is formed at a position confronting the opening 2a at an upstream side end of the intake duct 2. In this case, an intake air passing area of the tertiary filter layer 13 is equivalent or more than equivalent to that of the primary and secondary filter layers 11 and 12 because of the recess 13e, despite a smaller room for formation is available to the tertiary filter layer 13.

Meanwhile, a downstream side end portion 13f of the recess 13e is located at an upstream side of a wind velocity reference line WL. The wind velocity reference line WL stands for a reference line by which to distinguish whether or not noise and/or vibration is generated in the tertiary filter layer 13 by a turbulent flow of the intake air when the intake air flows into the intake duct 2 from the filter unit 1, more specifically a reference line serving as an index showing whether or not flow velocity inside the filter unit 1 exceeds 5.7 m/sec. It has been proven through an experiment performed by the inventors of the present invention that the intake air flow velocity is less than 5.7 m/sec in an upstream side area of the wind velocity reference line WL. Therefore, it is to be understood that noise or vibration due to a turbulent flow of the intake air is not generated at the tertiary filter layer 13 in which the recess 13e is formed.

For example, in case where the intake duct 2 is of a cylindrical shape, when a diameter of the intake duct 2 is denoted by D (meters), a flow passage area thereof by $A=\pi D^2/4$ (square meters), a wind velocity by V=5.7 m/sec, a flow amount by Q (cubic meters/sec), a distance X from the opening 2a of the intake duct 2 communicating with inside of the filter unit 1 to the wind velocity reference line WL can be obtained by the following formula (1).

$$X=[(Q/V-A)/10]^{1/2} \tag{1}$$

Also, in case where the intake duct 2 is of a rectangular shape having shorter sides of W and longer sides of H, when a diameter of the intake duct 2 of a cylindrical shape having an equivalent area to that of the rectangle is denoted by $D=1.27\times[(W\times H)^5/(W+H)^2]^{0.125}$(meters), a flow passage area thereof by $A=\pi D^2/4$ (square meters), a wind velocity by V=5.7 m/sec, a flow amount by Q (cubic meters/sec), a distance X from the opening 2a of the intake duct 2 communicating with inside of the filter unit 1 to the wind velocity reference line WL can be obtained by the above formula (1).

Accordingly, when the downstream side end portion 13f of the recess 13e formed in the tertiary filter layer 13 is located farther than a distance X obtained by the formula (1) from the opening 2a of the intake duct 2, noise or vibration is not generated by a turbulent flow of the intake air at the recess 13e, hence in the tertiary filter layer 13.

Also, in this embodiment a single recess 13e is formed at the end face filter layer portion 13a of the tertiary filter layer 13, while a plurality of recesses may be formed toward a downstream side on the end face filter layer portion 13a. In addition, a shape of the recess 13e may be a bottomed cylinder, a bottomed rectangular cylinder, or grooves.

Further, in this embodiment the recess 13e is formed at the end face filter layer portion 13a of the tertiary filter layer 13, while a recess may be formed at lateral face filter layer portions 13b. Also, in the respective filter layers 11, 12 and 13 (including the weather louver 10), the end face filter layer portions 11a, 12a and 13a and the lateral face filter layer portions 11b, 12b and 13b are connected through a sharp corner, while the end faces and the lateral faces filter layer portions may be formed in a smooth continuous shape, such as a semicircular cylindrical shape or a hemispherical shape, etc.

As described above, in a gas turbine intake air filter unit according to the invention, since the plurality of unitary filters in the tertiary filter layer are disposed so as to include at least a recess toward a downstream side of the intake air flow, intake air passing area of the tertiary filter layer is increased in proportion to the area of the recessed portion, and increase of flow resistance of the intake air through the tertiary filter layer is properly restrained. Accordingly, smooth flow of the intake air is secured and driving loss of the air compressor is prevented, and besides a balance of collecting efficiency of the three filter layers and the intake air flow resistance becomes extremely favorable, therefore adherence of minute dust to the air compressor and reduction of life span of filter layer can be effectively avoided. In addition, since the recess is formed toward a downstream side of the intake air flow, there is no likelihood of interference with the secondary filter layers located at an upstream side thereof, and an optimum layout of the three filter layers can be maintained.

Also, disposing the downstream side end portion of the recess formed in the tertiary filter layer at an upstream side area of the wind velocity reference line serving as an index to distinguish whether or not noise and/or vibration is generated by a turbulent flow of the intake air effectively prevents generation of noise or vibration in the tertiary filter layer, while effectively maintaining the above described various advantages of forming a recess.

Also, by disposing the recess so as to confront an upstream side end opening of the intake duct, the recess falls on a path that a main stream of the intake air flowing toward the intake duct is passing through, therefore clogging by dust and increase thereby of flow resistance in the tertiary filter layer can be efficiently avoided.

What is claimed is:

1. A gas turbine intake air filter unit, comprising:

a primary filter layer, a secondary filter layer, and a tertiary filter layer placed at an upstream side end portion of an intake duct that leads intake air into an internal area of a gas turbine and sequentially aligned from an upstream side; wherein said primary, secondary and tertiary filter layers respectively include a plurality of unitary filters; and said plurality of unitary filters of said tertiary filter layer are aligned in such a manner that at least a recess is provided in a downstream direction of said intake air flow.

2. The gas turbine intake air filter unit as set forth in claim 1, wherein a downstream side end portion of said recess is located at an upstream side of a wind velocity reference line serving as an index of whether or not a turbulent flow of intake air causes noise and/or vibration.

3. The gas turbine intake air filter unit as set forth in claim 2, wherein said recess is disposed so as to confront an upstream end opening of said intake duct.

4. The gas turbine intake air filter unit as set forth in claim 3, wherein each of said unitary filters of said primary filter layer and of said secondary filter layer is insert-fitted to a first fixing frame; and each of said unitary filters of said tertiary filter layer is insert-fitted to a second fixing frame.

5. The gas turbine intake air filter unit as set forth in claim 3, further comprising:

a weather louver for integrating and refracting intake air flow located at an upstream side of said primary filter layer.

6. The gas turbine intake air filter unit as set forth in claim 5, wherein said weather louver is formed so as to cover said upstream end opening of said intake duct in a bag shape.

7. The gas turbine intake air filter unit as set forth in claim 2, wherein said primary, secondary and tertiary filter layers are formed so as to cover said upstream end opening of said intake duct in a bag shape.

8. The gas turbine intake air filter unit as set forth in claim 2, wherein each of said unitary filters of said primary filter layer and of said secondary filter layer is insert-fitted to a first fixing frame; and each of said unitary filters of said tertiary filter layer is insert-fitted to a second fixing frame.

9. The gas turbine intake air filter unit as set forth in claim 2, further comprising:

a weather louver for integrating and refracting intake air flow located at an upstream side of said primary filter layer.

10. The gas turbine intake air filter unit as set forth in claim 9, wherein said weather louver is formed so as to cover said upstream end opening of said intake duct in a bag shape.

11. The gas turbine intake air filter unit as set forth in claim 1, wherein said recess is disposed so as to confront an upstream end opening of said intake duct.

12. The gas turbine intake air filter unit as set forth in claim 11, wherein said primary, secondary and tertiary filter layers are formed so as to cover said upstream end opening of said intake duct in a bag shape.

13. The gas turbine intake air filter unit as set forth in claim 11, wherein each of said unitary filters of said primary filter layer and of said secondary filter layer is insert-fitted to a first fixing frame; and each of said unitary filters of said tertiary filter layer is insert-fitted to a second fixing frame.

14. The gas turbine intake air filter unit as set forth in claim 11, further comprising:

a weather louver for integrating and refracting intake air flow located at an upstream side of said primary filter layer.

15. The gas turbine intake air filter unit as set forth in claim 14, wherein said weather louver is formed so as to cover said upstream end opening of said intake duct in a bag shape.

16. The gas turbine intake air filter unit as set forth in claim 1, wherein said primary, secondary and tertiary filter layers are formed so as to cover said upstream end opening of said intake duct in a bag shape.

17. The gas turbine intake air filter unit as set forth in claim 16, further comprising:

a weather louver for integrating and refracting intake air flow located at an upstream side of said primary filter layer.

18. The gas turbine intake air filter unit as set forth in claim 1, wherein each of said unitary filters of said primary filter layer and of said secondary filter layer is insert-fitted to a first fixing frame; and each of said unitary filters of said tertiary filter layer is insert-fitted to a second fixing frame.

19. The gas turbine intake air filter unit as set forth in claim 1, further comprising:

a weather louver for integrating and refracting intake air flow located at an upstream side of said primary filter layer.

20. The gas turbine intake air filter unit as set forth in claim 19, wherein said weather louver is formed so as to cover said upstream end opening of said intake duct in a bag shape.

* * * * *